(12) United States Patent
Hanna

(10) Patent No.: US 11,775,207 B2
(45) Date of Patent: Oct. 3, 2023

(54) TECHNIQUES TO PERFORM A WRITE OPERATION

(71) Applicant: Micron Technology, Inc., Boise, ID (US)

(72) Inventor: Stephen Hanna, Fort Collins, CO (US)

(73) Assignee: Micron Technology, Inc., Boise, ID (US)

( * ) Notice: Subject to any disclaimer, the term of this patent is extended or adjusted under 35 U.S.C. 154(b) by 30 days.

(21) Appl. No.: 17/651,214

(22) Filed: Feb. 15, 2022

(65) Prior Publication Data

US 2023/0259304 A1    Aug. 17, 2023

(51) Int. Cl.
*G06F 3/06*    (2006.01)

(52) U.S. Cl.
CPC .......... *G06F 3/0656* (2013.01); *G06F 3/0604* (2013.01); *G06F 3/0659* (2013.01); *G06F 3/0688* (2013.01)

(58) Field of Classification Search
CPC .... G06F 3/0656; G06F 3/0604; G06F 3/0659; G06F 3/0688
See application file for complete search history.

(56) References Cited

U.S. PATENT DOCUMENTS

| 2019/0303293 | A1* | 10/2019 | Byun | G06F 12/0246 |
| 2020/0241798 | A1* | 7/2020 | Kanno | G06F 3/064 |
| 2021/0223991 | A1* | 7/2021 | Lee | G06F 3/0656 |

* cited by examiner

*Primary Examiner* — Michelle T Bechtold
(74) *Attorney, Agent, or Firm* — Holland & Hart LLP

(57) ABSTRACT

Methods, systems, and devices for techniques to perform a write operation are described. In response to receiving a sequential write command from a host system, the memory system may determine non-linear offsets for a set of requests for portions of the data. The memory system may determine a first subset of the data that includes data segments having logical addresses with gaps corresponding to the offset between the data segments to store in a first memory device. The memory system may store the first subset in a buffer and program the first subset to the first memory device. Additionally, the memory system may determine a second subset of data that using the offset and may transmit a second set of requests for the second subset of data, which may be stored in the buffer and programmed to a second memory device.

25 Claims, 7 Drawing Sheets

TECHNIQUES TO PERFORM A WRITE OPERATION

FIELD OF TECHNOLOGY

The following relates to one or more systems for memory, including techniques to perform a write operation.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
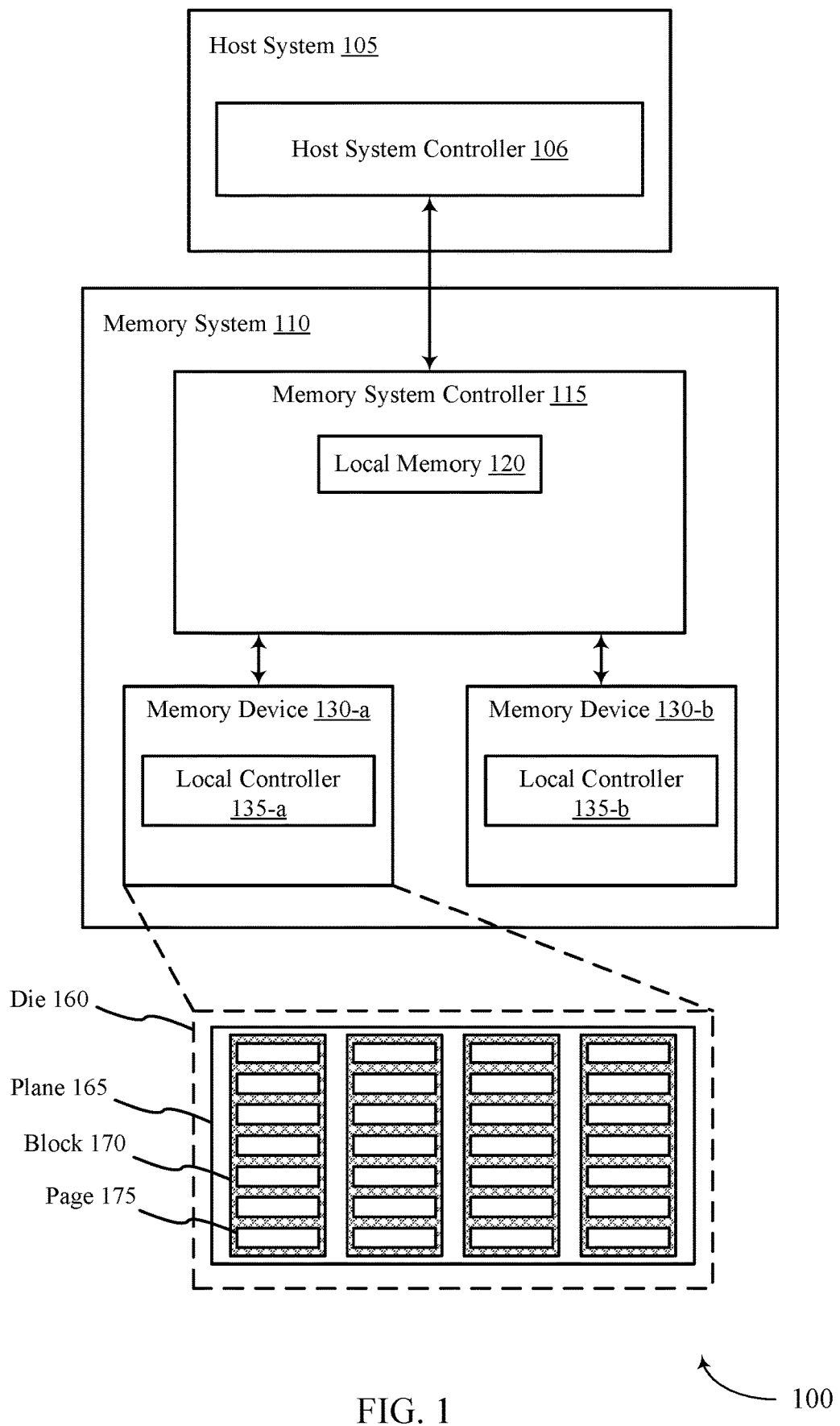
FIG. 1 illustrates an example of a system that supports techniques to perform a write operation in accordance with examples as disclosed herein.

In some memory system, such as a managed NAND system or other managed flash device systems, the bandwidth and speed of access operations, such as sequential read operations, may be increased by performing certain operations associated with the read operation at least partially in parallel. For example, if data associated with the read operation is stored in a set of segments across multiple memory devices in a pattern such that a first memory device stores a first segment of the data and a second segment of the data, a second memory device stores a third segment of the data that is consecutive with the first segment and a fourth segment of the data that is consecutive with the second segment, and so on (e.g., the data is stored in an interleaved or z-pattern), the memory system may retrieve the segments of the data from multiple memory devices in parallel for a sequential read operation and transmit the data to a host system in order (e.g., in a continuous block of logical addresses). In some systems, to store the data in the pattern (e.g., as part of a sequential write operation), a memory system may first retrieve all or a substantial portion of the data from the host system using a set of requests, such as ready to transfer (RTT) commands, having block offsets corresponding to the amount of data written to each memory device. That is, the data may be retrieved from the host system for each memory device sequentially. In some cases, the memory system may store the data in a buffer of the memory system prior to programming the data across the memory devices in the pattern. That is, the data may first be "staged" at the buffer of the memory system. However, staging the data in such a way may unnecessarily use a large amount of space of the buffer (e.g., large enough to store all or a substantial portion of the data corresponding to a sequential read operation), which may decrease the bandwidth and power efficiency of a sequential write operation, as well as decreasing overall lifetime of the memory system.

As described herein, a memory system may use a relatively smaller buffer to stage segments of data associated with a sequential write operation. In some cases, in response to receiving a sequential write command, the memory system may determine non-linear or interleaved offsets for a set of requests, such as ready to transfer (RTT) commands, for portions of the data. For example, the memory system may determine a first subset of the data that includes data segments having logical addresses with gaps corresponding to the offset between the data segments to store in a first memory device. The memory system may subsequently transmit a first set of requests for the first subset, store the first subset in the buffer, and program the first subset to the first memory device. Additionally, the memory system may determine a second subset of data that includes at least one data segment with a logical address between the data segments of the first subset using the offset, and may transmit a second set of requests for the second subset of data, which may be stored in the buffer and subsequently programmed to the second memory device. In some cases, the memory system may reuse the buffer, for example by storing the second subset in a same set of registers of the buffer used to store the first subset. In some cases, programming the first subset of data to the first memory device and retrieving the second subset of data may be performed at least partially in parallel. Thus, the memory system may store data in the pattern used by a sequential read, while reducing storage space used by the buffer, improving speed and bandwidth of data transfers, and reducing power consumption. Although the above example included two memory devices, the techniques described herein may be applied to memory system which include or use any quantity of memory devices to store data.

Figure 2:
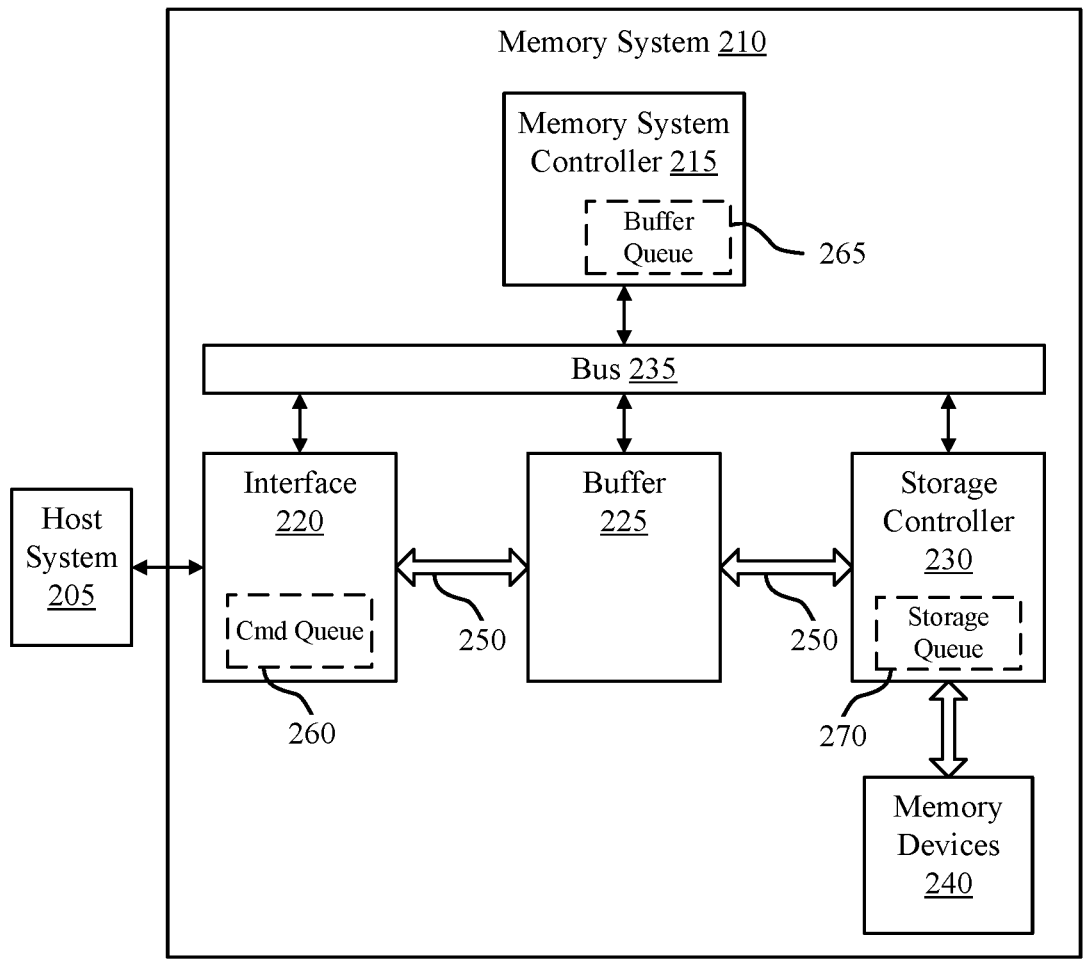
FIG. 2 illustrates an example of a system that supports techniques to perform a write operation in accordance with examples as disclosed herein.

Features of the disclosure are initially described in the context of systems, devices, and circuits with reference to FIGS. 1 through 2. Features of the disclosure are described in the context of a system and a process flow with reference to FIGS. 3-4B. These and other features of the disclosure are further illustrated by and described in the context of an apparatus diagram and flowchart that relate to techniques to perform a write operation with reference to FIGS. 5-6.

FIG. 1 illustrates an example of a system 100 that supports techniques to perform a write operation in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

The system 100 may include any quantity of non-transitory computer readable media that support techniques to perform a write operation. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some cases, a memory system 110 may use a relatively smaller buffer to stage segments of data associated with a sequential write operation. In some cases, in response to receiving a sequential write command from a host system 105, the memory system 110 may determine non-linear or interleaved offsets for a set of requests, such as ready to transfer (RTT) commands, for portions of the data. For example, the memory system 110 may determine a first subset of the data that includes data segments having logical addresses with gaps corresponding to the offset between the data segments to store in a first memory device 130. The memory system 110 may subsequently transmit a first set of requests for the first subset, store the first subset in the buffer, and program the first subset to the first memory device 130. Additionally, the memory system 110 may determine a second subset of data that includes at least one data segment with a logical address between the data segments of the first subset using the offset, and may transmit a second set of requests for the second subset of data, which may be stored in the buffer and subsequently programmed to a second memory device 130. In some cases, the memory system 110 may reuse the buffer, for example by storing the second subset in a same set of registers of the buffer used to store the first subset.

FIG. 2 illustrates an example of a system 200 that supports techniques to perform a write operation in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on (e.g., using) the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, after the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some cases, a memory system 210 may use a buffer 225 to stage segments of data associated with a sequential write operation. In some cases, in response to receiving a sequential write command from a host system 205, the memory system 210 may determine non-linear or interleaved offsets for a set of requests, such as ready to transfer (RTT) commands, for portions of the data. For example, the memory system 210 may determine a first subset of the data that includes data segments having logical addresses with gaps corresponding to the offset between the data segments to store in a first memory device 240. The memory system 210 may subsequently transmit a first set of requests for the first subset, store the first subset in the buffer 225, and program the first subset to the first memory device 240. Additionally, the memory system 210 may determine a second subset of data that includes at least one data segment with a logical address between the data segments of the first subset using the offset, and may transmit a second set of requests for the second subset of data, which may be stored in the buffer 225 and subsequently programmed to a second memory device 240. In some cases, the memory system 210 may reuse the buffer, for example by storing the second subset in a same set of registers of the buffer used to store the first subset.

Figure 3:
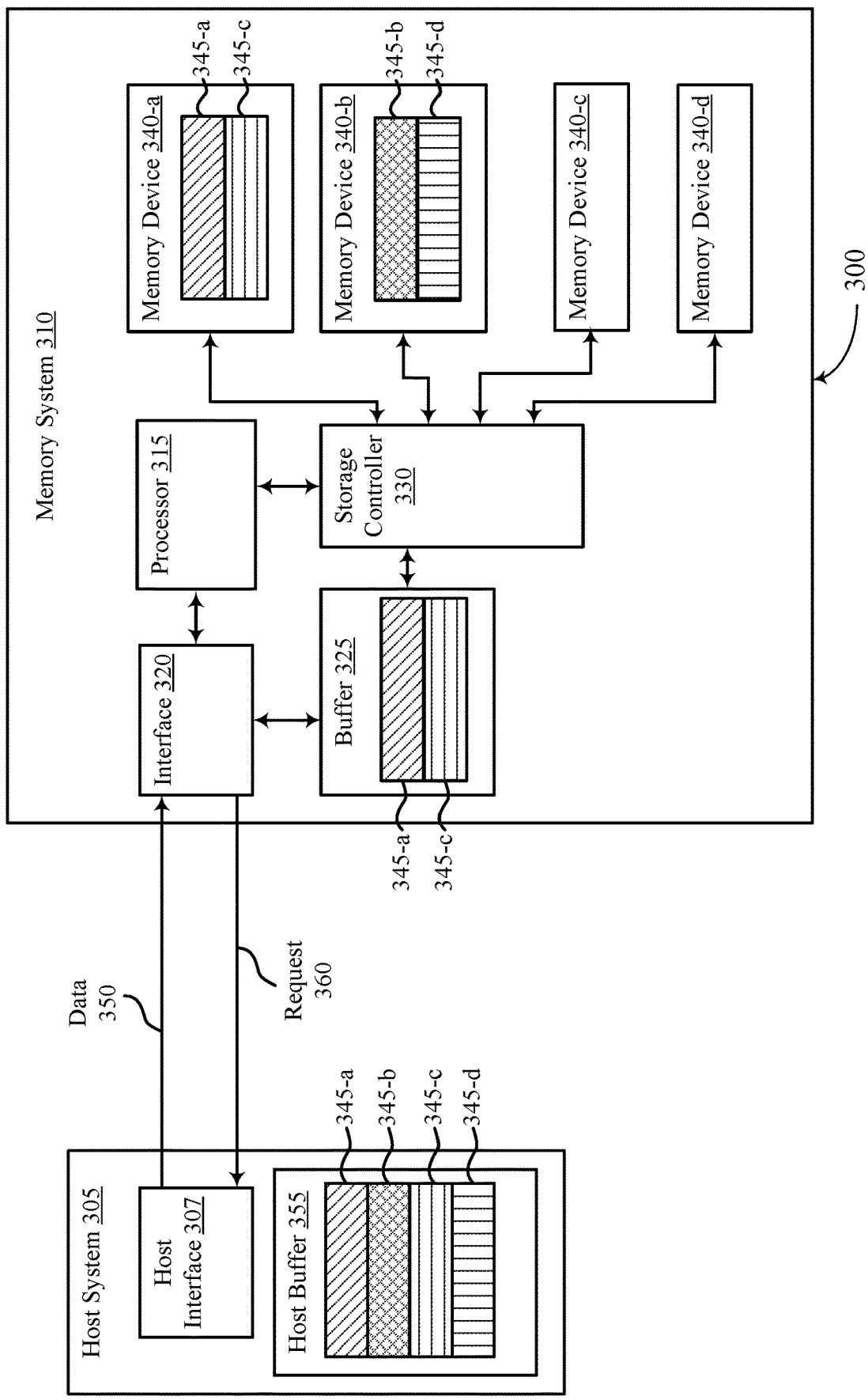
FIG. 3 illustrates an example of a system that supports techniques to perform a write operation in accordance with examples as disclosed herein.

FIG. 3 illustrates an example of a system 300 that supports techniques to perform a write operation in accordance with examples as disclosed herein. The system 300 may include a memory system 310 configured to perform access operations, such as read operations or write operations, associated with data from a host system 305, which may be examples of the corresponding devices as described with reference to FIGS. 1 and 2. The host system 305 and the memory system 310 may perform a sequential access operation, such as a sequential read operation or a sequential write operation to access or modify data stored in a plurality of memory devices 340, such as a first memory device 340-*a*, a second memory device 340-*b*, a third memory device 340-*c* and a fourth memory device 340-*d*. In some cases, the plurality of memory devices 340 may be examples of NAND devices, and may include blocks of memory cells configured to store logic levels corresponding to a single bit or multiple bits, such single level cell (SLC) access operations, multi-level cell (MLC) access operations, triple-level cell (TLC) access operations, quad-level cell (QLC) access operations, and so on. In some cases, a sequential access operation may be associated with data having a continuous (e.g., sequential) range of logical block addresses (LBAs).

For example, the host system 305 may issue a sequential read command for a plurality of data segments 345, such as a first data segment 345-a, a second data segment 345-b, a third data segment 345-c, and a fourth data segment 345-d. In some cases, access commands (e.g., including the sequential read command) may be transmitted by a host interface 307 of the host system 305 and received by an interface 320 of the memory system 310, which may be an example of the interface 220 as described with reference to FIG. 2.

A data segment 345 may include data associated with a range of continuous LBAs, such as a one or more pages of data or other units or groupings of data. In some cases, the data segments 345 of the plurality may be continuous across each of the data segments 345. That is, the LBAs of the second data segment 345-b may be sequential with the LBAs of the first data segment 345-a, the LBAs of the third data segment 345-c may be sequential with the LBAs of the second data segment 345-b, and the LBAs of the fourth data segment 345-d may be sequential with the LBAs of the third data segment 345-c.

In some cases, to improve the speed of the sequential read command, the bandwidth of the sequential read command, or both, the plurality of data segments 345 may be stored across multiple memory devices 340 of the memory system 310. For example, a first memory device 340-a may store the first data segment 345-a and the third data segment 345-c, while a second memory device 340-b may store the second data segment 345-b and the fourth data segment 345-d. In response to receiving a sequential read command, the interface 320 may transmit an indication of the sequential read command to a storage controller 330 (e.g., via a processor 315) which may be an example of the storage controller 230 as described with reference to FIG. 2. In some cases, the storage controller 330 may include channels or paths between each of the memory devices 340. Accordingly, the memory controller 330 may issue a request for data stored in each of the memory devices 340 in parallel. Upon receiving the data segments 345, the storage controller 330 may temporarily store the data segments 345 in a buffer 325 and subsequently the memory system 310 may transmit the data segments 345 to the host system 305, for example via the interface 320 in order. In some cases, the buffer 325 may include a set of segment buffers, each segment buffer configured to store a data segment. In some examples, the quantity of segment buffers of the buffer 325 may be less than the quantity of data segments 345 included in the plurality of data segments 345. For example the quantity of segment buffers may be less than a product of the quantity of the plurality of memory devices 340 and a quantity of levels or logic states configured to be stored in a memory cell of a memory device 340.

In some cases, the memory system 305 may perform a sequential write operation to store the plurality of data segments 345 across the memory devices 340. By way of example, the host system 305 may transmit a command (e.g., using a host interface 307) to the memory system 310 to store the plurality of data segments 345. In some cases, the plurality of data segments 345 may initially be stored at a host buffer 355 of the host system 305. In response to receiving the command from the host system 305 to perform the sequential write operation, the memory system 310 may generate and transmit to the host system 305 one or more requests 360 for data segments 435 which are discontinuous (e.g., a set of data segments with gaps between the LBAs of the data segments).

In some examples, the request 360 may be an example of an RTT command, and may indicate a particular data segment 345 for the host system 305 to transfer to the memory system 310. In some cases, a request 360 may include an offset to indicate which data segment 345 to transfer. The offset may be an example of a quantity LBAs or a quantity of data segments, and may indicate a starting address or a particular data segment 345 for a request 360. In some cases, the offset may correspond to the quantity of memory devices 340 used to store the data. For example, if memory system 310 uses two memory devices 340 to store the data, the offset may correspond to two data segments, if memory system 310 uses four memory devices 340 to store the data, the offset may correspond to four data segments, and so on.

For example, the memory system 310 may generate a first plurality of requests, including a first request and a second request, and transmit the first plurality of requests to the host system 305. In some cases, the first request may include an offset indicating the first data segment 345-a and the second request may include an offset indicating the third data segment 345-c. The offset indicating the third data segment 345-c may depend on a quantity of the memory devices 340. For example, if the quantity of the memory devices 340 is two, the offset may be two segments while if the quantity of the memory devices 340 is four, the offset may be four segments. In response to receiving the first plurality of requests, the host system 305 may transmit the first data segment 345-a and the third data segment 345-c to the memory system 310, for example as part of a data transfer 350. The memory system may store the first data segment 345-a and the third data segment 345-c in the buffer 325, and subsequently store the first data segment 345-a and the third data segment 345-c in the first memory device 340-a. In some case, the first data segment 345-a and the third data segment 345-c may be written using a single pass of a multi-bit access operation, for example by being programmed to a same set of MLC blocks. In some cases, a quantity of segment buffers of the buffer 325 may correspond to or depend on the quantity of binary logic states that may be programmed to a memory cell of the memory devices 340. For example, if the memory devices 340 include MLC blocks, the quantity of segment buffers of the buffer 325 may be two (e.g., to hold the first data segment 345-a and the third data segment 345-c), or may include one or more additional segment buffers. Alternatively, if the memory devices 340 include TLC blocks or QLC blocks, the quantity of segment buffers of the buffer 325 may be three or four, respectively.

In some cases, after transmitting the first plurality of requests, the memory system may generate and transmit a second plurality of requests, including a third request and a fourth request. In some cases, the third request may include an offset indicating the second data segment 345-b and the fourth request may include an offset indicating the fourth data segment 345-d. The memory system may store the second data segment 345-b and the fourth data segment 345-b in the buffer 325. In some cases, portions of the buffer 325 may be re-used across operations transferring the plurality of segments 445 to the memory devices 340. For example, the buffer 325 may include a quantity of buffers (e.g., where each "buffer" stores one data segment 345) that is less than a quantity of segments 445 associated with the sequential write operation received from the host system 305. In some cases, the quantity of buffers may be equal to two times a quantity of segments for storing in each of the memory devices 340. In such a case, the memory system 310 may use the buffers in a "ping-pong" manner, using a first set of buffers for data segments stored in a first memory device, a second set of buffers for data segments stored in a second memory device, the first set of buffers for data segments stored in a third memory device, and so on (e.g., using one set of buffers at a time for receiving data from the host system 305 and another set of buffers for writing data to the memory devices). Alternatively, the quantity of buffers may be less than two times the quantity of segments for storing in each of the memory devices 340. For example, where writing data segments to the memory devices 340 takes less time than receiving the data segments from the host system 305, the memory system 310 may free up buffers prior to receiving all of the data segments for a given memory device, and may thus re-use one or more buffers in operations associated with a next memory device using a rotating buffer arrangement. Thus, one or more of the data segments 345 associated with the second plurality of requests may be stored in a same location of the buffer 325 used to store one or more data segments associated with the first plurality of requests, such as to the segment buffers of the buffer 325 used to store the first data segment 345-*a* and/or the third data segment 345-*c* (e.g., at least portions of the buffer 325 may be re-used after storing the first data segment 345-*a* and the third data segment 345-*c*). For example, data segment 345-*b* may be stored to a third segment buffer of buffer 325 while data segments 345-*a* and 345-*c* are being written to memory device 340, and data segment 345-*d* may be stored to one of the first or second segment buffers of buffer 325 used for data segments 345-*a* and 345-*c*. Subsequently, the memory system 310 may store the second data segment 345-*b* and the fourth data segment 345-*d* in the second memory device 340-*b*.

In some examples, the memory system 310 may store the data associated with the first plurality of requests in the first memory device 340-*a* concurrently with transmitting the second plurality of requests. For example, the second plurality of requests may be transmitted to the host system 305 during at least partially overlapping periods of time in which the memory system 310 transfers the first data segment 345-*a* and the third data segment 345-*c* from the buffer 325 to the storage controller 330 and subsequently to the first memory device 340-*a*.

It should be noted that, although the above example described the operations of four data segments 345 stored across two memory devices 340 for illustrative clarity, any quantity of data segments 345, memory devices 340, or both may be used. Further, the memory devices 340 may include examples of flash memory devices such as NAND devices, UFS devices, eMMC devices, and the like. In such examples, signaling similar to UFS RTT commands may be used to request particular data segments 345 from the host system 305.

Figure 4A:
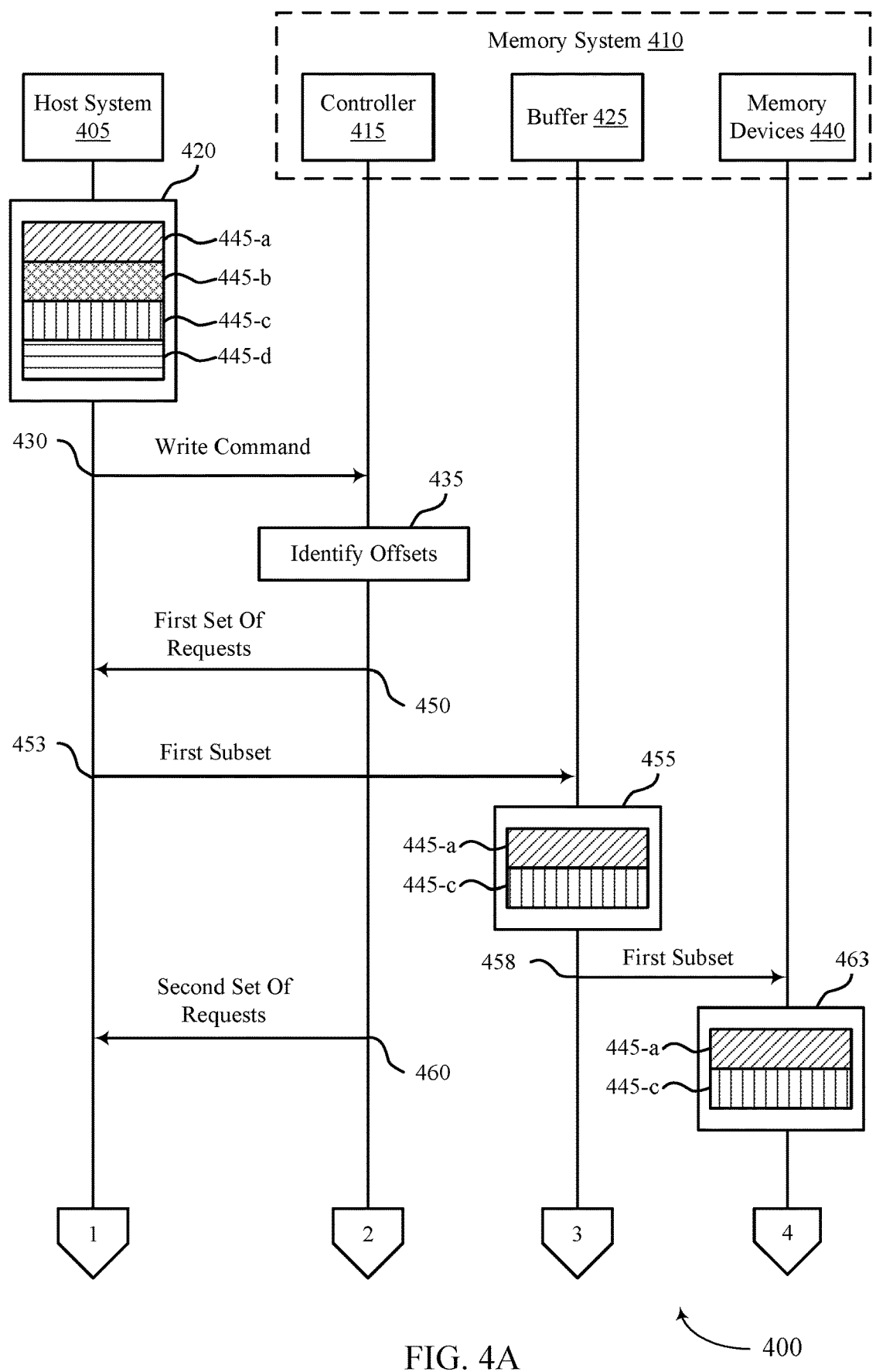
FIGS. 4A and 4B illustrate an example of a process flow that supports techniques to perform a write operation in accordance with examples as disclosed herein.
Figure 4B:
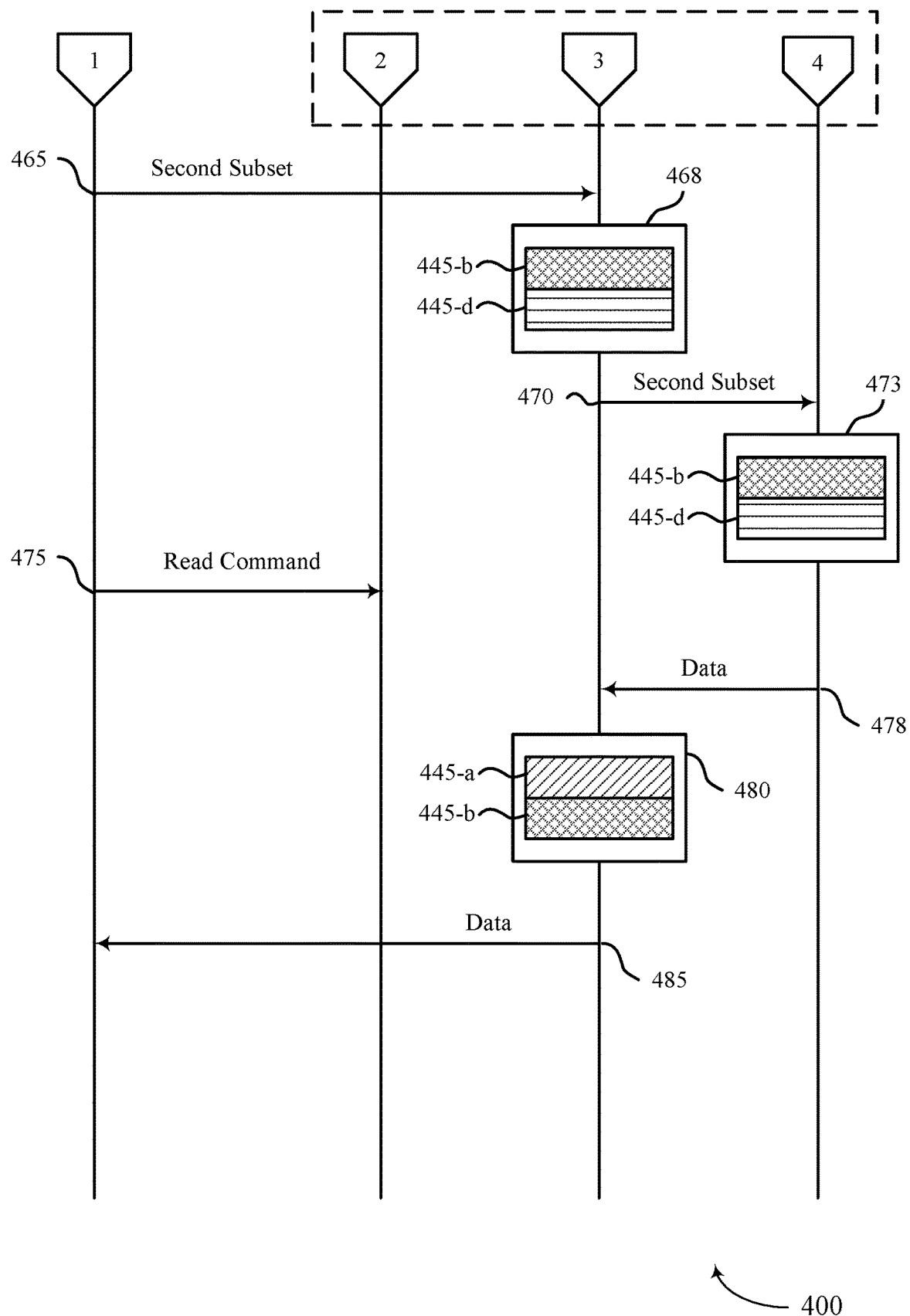

FIGS. 4A and 4B illustrate an example of a process flow 400 that supports techniques to perform a write operation in accordance with examples as disclosed herein. In some examples, process flow 400 may be implemented by aspects of the systems 300. The process flow 400 may include operations performed by a host system 405 and a memory system 410 which may be an example of the host system 305 and the memory system 310 described with reference to FIG. 3. For example, the memory system 410 may include a controller 415, a buffer 425, and one or more memory devices 440. In some examples, the controller 415 may be or may include components such as interface 320, processor 315, storage controller 330, or a combination thereof. In the following description of the process flow 400, the operations may be performed in a different order than the order shown. For example, specific operations may also be left out of the process flow 400, or other operations may be added to process flow 400.

The process flow 400 may include an example of information and signaling communicated between the host system 405 and the memory system 410 as part of sequential access operations, such as a write operation or a read operation. For example, the host system 405 may issue a sequential write command to store data to the memory system 410. In some cases, the host system 405 may, at 420, temporarily store the data in a host buffer. The data may include a set of data segments 445, such as a first data segment 445-*a*, a second data segment 445-*b*, third data segment 445-*c*, and a fourth data segment 445-*d*, which may be examples of the corresponding data segments as described with reference to FIG. 3. The data segments 445 may be stored in the host buffer in sequential order (e.g., according to logical block addresses associated with the data segments).

In some examples, the process flow 400 may include communicating a write command for the data segments 445 stored in the buffer of the host system 405. For example, at 430, the host system 405 may transmit the write command to the memory system 410 (e.g., to the controller 415 of the memory system 410). The write command may include information about the data to be stored at the memory system 410, such as an indication of a size of the data, a size of each data segments 445, a quantity of the data segments 445, an indication of a range of addresses, such as LBAs, for the data, or a combination thereof.

In some cases, the process flow 400 may include identifying an offset for a set of requests for the data associated with the command communicated at 430, such as a set of RTT commands. For example, at 435, the controller 415 may use the information about the data included in the command as well as properties of the memory devices 440, such as a quantity of memory devices 440 used to store the data, to identify offsets for the requests. For example, if the memory system uses two memory devices 440 to store the data, the offset may correspond to two data segments 445.

In some cases, as part of identifying the offsets, the memory system 410 may determine one or more subsets of the data segments 445 to be retrieved from the host system 405. For example, the memory system 410 may determine that a first subset to be retrieved from the host system 405 may include the first data segment 445-*a* and the third data segment 445-*c*, because the third data segment 445-*c* may be offset from the first data segment 445-*a* by two (e.g., a gap or offset of two data segments may be between a starting logical address of the first data segment 445-*a* and a starting address of the third data segment 445-*c*). Additionally, the memory system 40 may determine that a second subset to be retrieved from the host system 405 may include the second data segment 445-*b* and the fourth data segment 445-*d*. In some cases, the second data segment 445-*b* may include a logical address between the first data segment 445-*a* and the third data segment 445-*c*. For example, the offset of the request for second data segment 445-*b* may be less than the offset of the request for the third data segment 445-*c*.

In some cases, the quantity of data segments included in a subset may depend on the quantity of bits a memory cell of a memory device 440 is configured to store. For example, if the memory devices 440 include MLC blocks, each subset may include two data segments 445. Alternatively, if the memory devices 440 include TLC blocks, each subset may include three data segments 445.

In some examples, the memory system 410 may generate a first set of requests for the first subset of data segments 445. For example, the memory system 410 may generate a first request for the first data segment 445-*a* and a second request for the third data segment 445-*c*. In some cases, each request may include an identified offset indicating the corresponding data segment 445. In some cases, the memory system 410 may generate additional requests for the first set of requests (e.g., if the memory devices 440 included higher level blocks such as TLC blocks). Accordingly, the first set of requests may, at 450, be transmitted, for example from the memory system 410 to the host system 405.

In some cases, the process flow 400 may include communicating the first subset of data segments 445. For example, at 453, the host system 405 may, in response to receiving the first set of requests from the memory system 410, transmit the first subset of data (e.g., the first data segment 445-*a* and the third data segment 445-*c*). In some examples, the first subset of data may, at 455, be temporarily stored in the buffer 425. For example, the host system 405 may transmit the first subset of data segments 445 serially. Accordingly, the memory system 410 may first receive and store, in a first segment buffer of the buffer 425, the first data segment 445-*a* and subsequently receive and store, in a second segment buffer of the buffer 425, the third data segment 445-*c*.

In some cases, the process flow 400 may include writing the first subset of data to the memory devices 440. For example, at 458, the memory system 410 may issue a multi-level write command to a first memory device of the memory devices 440. Accordingly, first memory device may, at 463, write the first subset of data from the buffer 425 to a set of memory cells. In some cases, the first subset of data may be written using a single pass (e.g., both the first data segment 445-*a* and the third data segment 445-*c* may be written to a same set of memory cells, such as an MLC block, in single access operation performed by the first memory device).

In some cases, the process flow 400 may include transmitting a second set of requests for the second subset of data segments 445. For example, at 460, the memory system may generate and transmit the second set of requests to the host system 405. In some cases, transmitting the second set of requests and writing the first subset of the data segments 445 may be performed at least partially in parallel (e.g., the memory system 410 may retrieve the second subset from the host system 405 in a time period that at least partially overlaps with the time period that the first subset is being written to the first memory device).

In some cases, the process flow 400 may include communicating the second subset of data segments 445. For example, at 465, the host system 405 may, in response to receiving the second set of requests from the memory system 410, transmit the second subset of data (e.g., the second data segment 445-*b* and the fourth data segment 445-*d*). In some examples, the memory system 410 may, at 468, reuse the buffer 425 to temporarily store the second subset. For example, the host system 405 may first receive and store, in the first segment buffer of the buffer 425, the second data segment 445-*b* and subsequently receive and store, in the second segment buffer of the buffer 425, the fourth data segment 445-*d*. Additionally or alternatively, the memory system 410 may stream or loop through a quantity of segment buffers of the buffer 425. For example, the second data segment 445-*b* may be stored in a third segment buffer of the buffer 425 (e.g., to allow time to complete the write operation of the first data segment 445-*a* and the third data segment 445-*c* to the first memory device), and the fourth data segment may loop back to be stored in the first segment buffer of the buffer 425.

In some cases, the process flow 400 may include writing the second subset of data to the memory devices 440. For example, at 470, the memory system 410 may issue a multi-level write command to a second memory device of the memory devices 440. Accordingly, second memory device may, at 473, write the second subset of data from the buffer 425 to a set of memory cells. In some cases, the second subset of data may be written using a single pass (e.g., both the second data segment 445-*b* and the fourth data segment 445-*d* may be written to a same set of memory cells, such as an MLC block, using a single access operation). Accordingly, the process flow 400 may allow for a reduced size of the buffer 425, for example by allowing the buffer 425 to be smaller than the total size of the plurality of data segments 445, while writing the data segments 445 across the memory devices 440 in an interleaved or z-pattern (e.g., in a pattern compatible with a sequential read of continuous block of logical addresses).

In some cases, the process flow may include a sequential read operation to access the data written during the sequential write operation. In some cases, a sequential read operation for memory cells storing multiple bits of data may output data segments corresponding to each bit sequentially (e.g., may output a data segment for data corresponding to a first bit first, then a data segment for data corresponding to a second bit, and so on). For example, at 475, the host system 405 may transmit a sequential read command to the memory system 410. In response to receiving the sequential read command, the memory system 410 may, at 478, retrieve the data segments 445 of the data sequentially. For example, the memory system 410 may retrieve the first data segment 445-*a* from the first memory device and may, at 480, temporarily store the first data segment 445-*a* in the buffer 425 (e.g., in the first segment buffer of the buffer 425). Additionally, the memory system 410 may retrieve the second data segment 445-*b* from the second memory device and temporarily store the second data segment 445-*b* in the buffer 425 (e.g., in the second segment buffer of the buffer 425). Because the first data segment 445-*a* and the second data segment 445-*b* were stored in separate memory devices 440 during the sequential write operation, retrieving the first data segment 445-*a* and the second data segment 445-*b* may be performed at least partially in parallel.

In some cases, after retrieving and storing a first portion of the data (e.g., the first data segment 445-*a* and the second data segment 445-*b*), the memory system may, at 485, transmit the first portion of the data to the host system 405. The memory system may retrieve and store a second portion of the data (e.g., the third data segment 445-*c* and the fourth data segment 445-*d*) in the buffer 425 subsequently to retrieving and storing the first portion of the data. Retrieving and storing the second portion of the data may occur during a time period that at least partially overlaps with transmitting the first portion of the data to the host system 405. The memory system may, subsequently to transmitting the first portion of the data to the host system 405, transmit the second data portion to the host system 405. The memory system 410 may continue retrieving and transmitting portions of the data until the data associated with the read command has been transmitted. Additionally or alternatively, the memory system 410 may retrieve and store each data segment of the data associated with the read request in the buffer 425 prior to transmitting the data to the host system.

Aspects of the process flow 400 may be implemented by a controller, among other components. Additionally or alternatively, aspects of the process flow 400 may be implemented as instructions stored in memory (e.g., firmware stored in a memory coupled with the host system 405 or the memory system 410). For example, the instructions, when executed by a controller (e.g., the controller 415), may cause the controller to perform the operations of the process flow 400.

Figure 5:
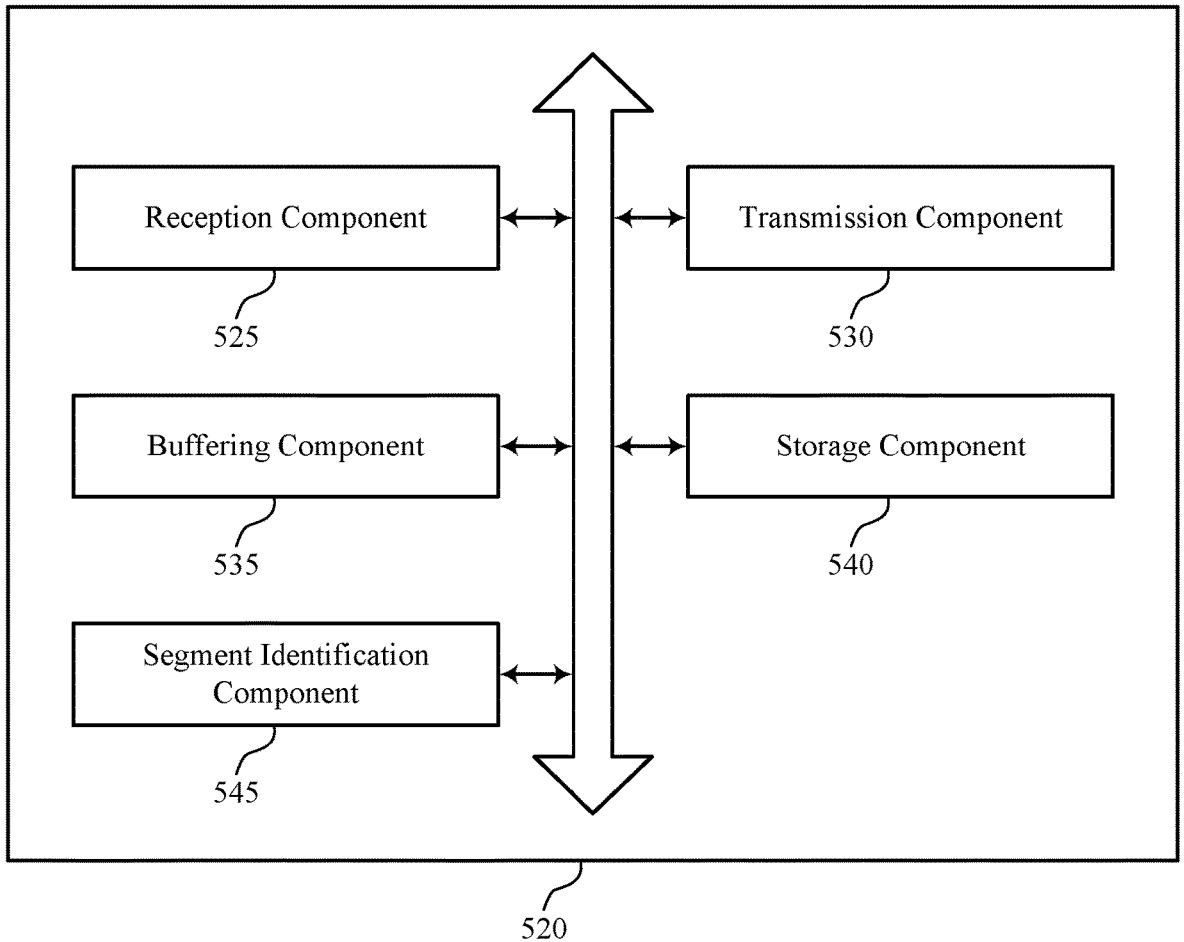
FIG. 5 shows a block diagram of a memory system that supports techniques to perform a write operation in accordance with examples as disclosed herein.

FIG. 5 shows a block diagram 500 of a memory system 520 that supports techniques to perform a write operation in accordance with examples as disclosed herein. The memory system 520 may be an example of aspects of a memory system as described with reference to FIGS. 1 through 4B. The memory system 520, or various components thereof, may be an example of means for performing various aspects of techniques to perform a write operation as described herein. For example, the memory system 520 may include a reception component 525, a transmission component 530, a buffering component 535, a storage component 540, a segment identification component 545, or any combination thereof. Each of these components may communicate, directly or indirectly, with one another (e.g., via one or more buses).

The reception component 525 may be configured as or otherwise support a means for receiving, at a controller of a memory system and from a host system, a write command associated with a plurality of data segments available at the host system, the memory system including a plurality of memory devices. The transmission component 530 may be configured as or otherwise support a means for transmitting, to the host system, a first plurality of requests for a first subset of the plurality of data segments, where the first plurality of requests includes a first request and at least one additional request that indicates an offset for a data segment associated with the at least one additional request from a previous request of the first plurality of requests, the offset based at least in part on a quantity of the plurality of memory devices. In some examples, the reception component 525 may be configured as or otherwise support a means for receiving, from the host system, each of the first subset of the plurality of data segments based at least in part on transmitting the first plurality of requests. The buffering component 535 may be configured as or otherwise support a means for storing the first subset of the plurality of data segments in a buffer at the memory system. The storage component 540 may be configured as or otherwise support a means for writing the first subset of the plurality of data segments to a first memory device of the plurality of memory devices.

In some examples, the transmission component 530 may be configured as or otherwise support a means for transmitting, to the host system and subsequent to transmitting the first plurality of requests, a second plurality of requests for a second subset of the plurality of data segments. In some examples, the reception component 525 may be configured as or otherwise support a means for receiving, from the host system, each of the second subset of the plurality of data segments based at least in part on transmitting the second plurality of requests. In some examples, the buffering component 535 may be configured as or otherwise support a means for storing the second subset of the plurality of data segments in the buffer at the memory system. In some examples, the storage component 540 may be configured as or otherwise support a means for writing the second subset of the plurality of data segments to a second memory device of the plurality of memory devices.

In some examples, transmitting the second plurality of requests and writing the first subset of the plurality of data segments in the first memory device at least partially overlap in time.

In some examples, storing the second subset of the plurality of data segments in the buffer stores at least one data segment of the second subset of the plurality of data segments in a location of the buffer used to store at least one data segment of the first subset of the plurality of data segments.

In some examples, the segment identification component 545 may be configured as or otherwise support a means for identifying, based at least in part on the offset, the first subset and the second subset of the plurality of data segments, the first subset including a first data segment with a first logical address and a second data segment with a second logical address, and the second subset including a third data segment with a third logical address between the first logical address and the second logical address, where the first request is for the first data segment and the at least one additional request is for the second data segment.

In some examples, the reception component 525 may be configured as or otherwise support a means for receiving, from the host system, a read command for the plurality of data segments. In some examples, the reception component 525 may be configured as or otherwise support a means for retrieving the first data segment from the first memory device. In some examples, the storage component 540 may be configured as or otherwise support a means for retrieving the third data segment from the second memory device, where retrieving the third data segment at least partially overlaps in time with retrieving the first data segment. In some examples, the transmission component 530 may be configured as or otherwise support a means for transmitting the first data segment and the third data segment to the host system.

In some examples, a second offset for a second data segment of the second subset is less than the offset for the data segment associated with the at least one additional request.

In some examples, to support writing the first subset of the plurality of data segments to the first memory device of the plurality of memory devices, the storage component 540 may be configured as or otherwise support a means for transmitting, to the first memory device, a command to perform a multi-level write operation for the first subset of the plurality of data segments.

In some examples, a quantity of segment buffers in the buffer of the memory system is less than a product of a quantity of the plurality of memory devices and a quantity of levels of the multi-level write operation.

In some examples, the plurality of memory devices includes a flash memory device.

In some examples, the first plurality of requests includes a ready to transfer (RTT) universal flash storage (UFS) command.

In some examples, a length of a data segment of the plurality of data segments corresponds to a page of a memory device of the plurality of memory devices.

Figure 6:
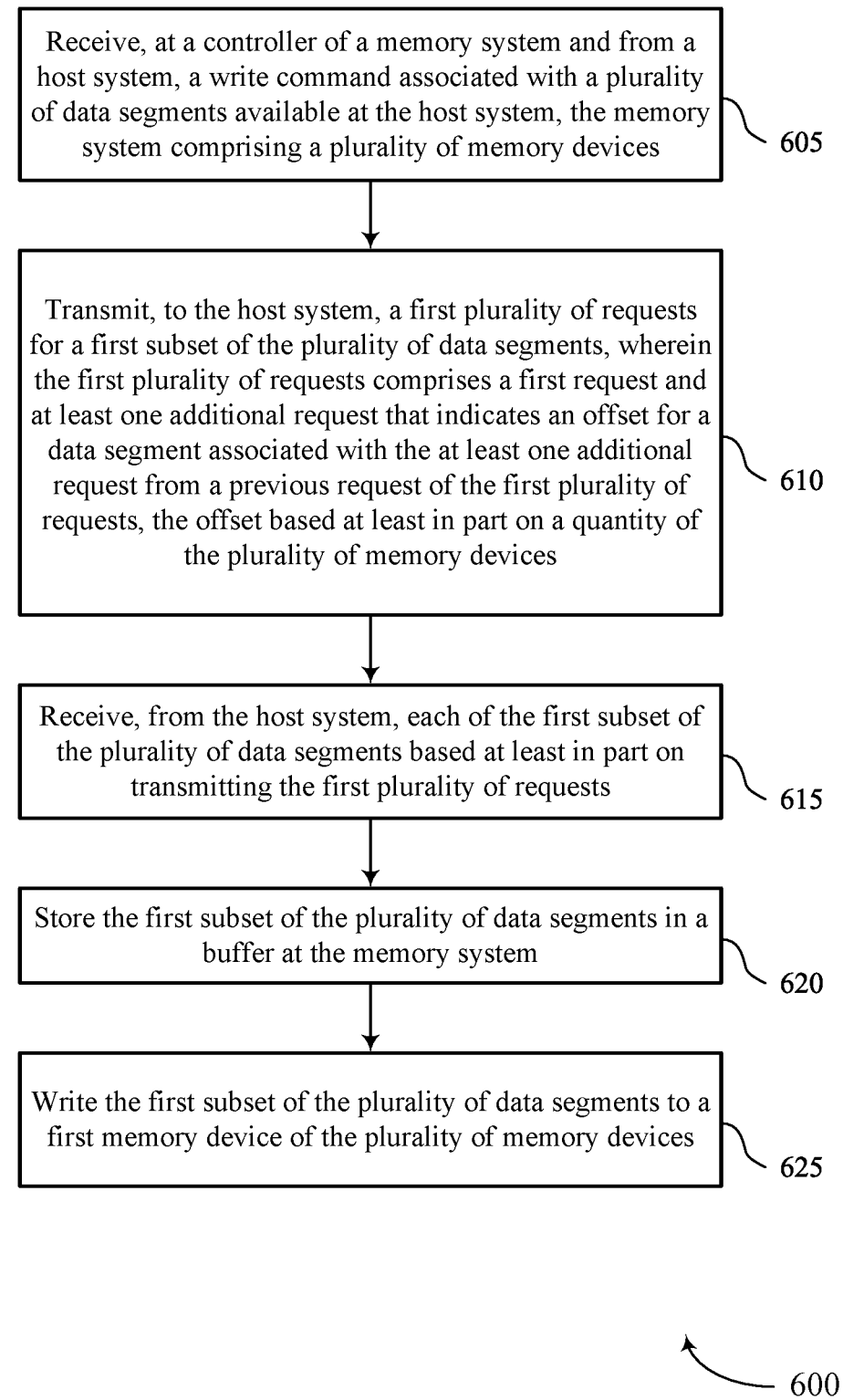
FIG. 6 shows a flowchart illustrating a method or methods that support techniques to perform a write operation in accordance with examples as disclosed herein.

FIG. 6 shows a flowchart illustrating a method 600 that supports techniques to perform a write operation in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally or alternatively, the memory system may perform aspects of the described functions using special-purpose hardware.

At 605, the method may include receiving, at a controller of a memory system and from a host system, a write command associated with a plurality of data segments available at the host system, the memory system including a plurality of memory devices. The operations of 605 may be performed in accordance with examples as disclosed herein. In some examples, aspects of the operations of 605 may be performed by a reception component 525 as described with reference to FIG. 5.

At 610, the method may include transmitting, to the host system, a first plurality of requests for a first subset of the plurality of data segments, where the first plurality of requests includes a first request and at least one additional request that indicates an offset for a data segment associated with the at least one additional request from a previous request of the first plurality of requests, the offset based at least in part on a quantity of the plurality of memory devices. The operations of 610 may be performed in accordance with examples as disclosed herein. In some examples, aspects of the operations of 610 may be performed by a transmission component 530 as described with reference to FIG. 5.

At 615, the method may include receiving, from the host system, each of the first subset of the plurality of data segments based at least in part on transmitting the first plurality of requests. The operations of 615 may be performed in accordance with examples as disclosed herein. In some examples, aspects of the operations of 615 may be performed by a reception component 525 as described with reference to FIG. 5.

At 620, the method may include storing the first subset of the plurality of data segments in a buffer at the memory system. The operations of 620 may be performed in accordance with examples as disclosed herein. In some examples, aspects of the operations of 620 may be performed by a buffering component 535 as described with reference to FIG. 5.

At 625, the method may include writing the first subset of the plurality of data segments to a first memory device of the plurality of memory devices. The operations of 625 may be performed in accordance with examples as disclosed herein. In some examples, aspects of the operations of 625 may be performed by a storage component 540 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a controller of a memory system and from a host system, a write command associated with a plurality of data segments available at the host system, the memory system including a plurality of memory devices; transmitting, to the host system, a first plurality of requests for a first subset of the plurality of data segments, where the first plurality of requests includes a first request and at least one additional request that indicates an offset for a data segment associated with the at least one additional request from a previous request of the first plurality of requests, the offset based at least in part on a quantity of the plurality of memory devices; receiving, from the host system, each of the first subset of the plurality of data segments based at least in part on transmitting the first plurality of requests; storing the first subset of the plurality of data segments in a buffer at the memory system; and writing the first subset of the plurality of data segments to a first memory device of the plurality of memory devices.

Aspect 2: The method, apparatus, or non-transitory computer-readable medium of aspect 1, further including operations, features, circuitry, logic, means, or instructions, or any combination thereof for transmitting, to the host system and subsequent to transmitting the first plurality of requests, a second plurality of requests for a second subset of the plurality of data segments; receiving, from the host system, each of the second subset of the plurality of data segments based at least in part on transmitting the second plurality of requests; storing the second subset of the plurality of data segments in the buffer at the memory system; and writing the second subset of the plurality of data segments to a second memory device of the plurality of memory devices.

Aspect 3: The method, apparatus, or non-transitory computer-readable medium of aspect 2 where transmitting the second plurality of requests and writing the first subset of the plurality of data segments in the first memory device at least partially overlap in time.

Aspect 4: The method, apparatus, or non-transitory computer-readable medium of any of aspects 2 through 3 where storing the second subset of the plurality of data segments in the buffer stores at least one data segment of the second subset of the plurality of data segments in a location of the buffer used to store at least one data segment of the first subset of the plurality of data segments.

Aspect 5: The method, apparatus, or non-transitory computer-readable medium of any of aspects 2 through 4, further including operations, features, circuitry, logic, means, or instructions, or any combination thereof for identifying, based at least in part on the offset, the first subset and the second subset of the plurality of data segments, the first subset including a first data segment with a first logical address and a second data segment with a second logical address, and the second subset including a third data segment with a third logical address between the first logical address and the second logical address, where the first request is for the first data segment and the at least one additional request is for the second data segment.

Aspect 6: The method, apparatus, or non-transitory computer-readable medium of aspect 5, further including operations, features, circuitry, logic, means, or instructions, or any combination thereof for receiving, from the host system, a read command for the plurality of data segments; retrieving the first data segment from the first memory device; retrieving the third data segment from the second memory device, where retrieving the third data segment at least partially overlaps in time with retrieving the first data segment; and transmitting the first data segment and the third data segment to the host system.

Aspect 7: The method, apparatus, or non-transitory computer-readable medium of any of aspects 2 through 6 where a second offset for a second data segment of the second subset is less than the offset for the data segment associated with the at least one additional request.

Aspect 8: The method, apparatus, or non-transitory computer-readable medium of any of aspects 1 through 7 where writing the first subset of the plurality of data segments to the first memory device of the plurality of memory devices includes operations, features, circuitry, logic, means, or instructions, or any combination thereof for transmitting, to the first memory device, a command to perform a multi-level write operation for the first subset of the plurality of data segments.

Aspect 9: The method, apparatus, or non-transitory computer-readable medium of aspect 8 where a quantity of segment buffers in the buffer of the memory system is less than a product of a quantity of the plurality of memory devices and a quantity of levels of the multi-level write operation.

Aspect 10: The method, apparatus, or non-transitory computer-readable medium of any of aspects 1 through 9 where the plurality of memory devices includes a flash memory device.

Aspect 11: The method, apparatus, or non-transitory computer-readable medium of any of aspects 1 through 10 where the first plurality of requests includes a ready to transfer (RTT) universal flash storage (UFS) command.

Aspect 12: The method, apparatus, or non-transitory computer-readable medium of any of aspects 1 through 11 where a length of a data segment of the plurality of data segments corresponds to a page of a memory device of the plurality of memory devices.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on (e.g., in response to) the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising: a controller associated with a memory device, wherein the controller is configured to cause the apparatus to:
   receive, at a controller of a memory system and from a host system, a write command associated with a plurality of data segments available at the host system, the memory system comprising a plurality of memory devices;
   transmit, to the host system, a first plurality of requests for a first subset of the plurality of data segments, wherein the first plurality of requests comprises a first request and at least one additional request that indicates an offset for a data segment associated with the at least one additional request from a previous request of the first plurality of requests, the offset based at least in part on a quantity of the plurality of memory devices;
   receive, from the host system, each of the first subset of the plurality of data segments based at least in part on transmitting the first plurality of requests;
   store the first subset of the plurality of data segments in a buffer at the memory system; and
   write the first subset of the plurality of data segments to a first memory device of the plurality of memory devices.

2. The apparatus of claim 1, wherein the controller is further configured to cause the apparatus to:

transmit, to the host system and subsequent to transmitting the first plurality of requests, a second plurality of requests for a second subset of the plurality of data segments;
receive, from the host system, each of the second subset of the plurality of data segments based at least in part on transmitting the second plurality of requests;
store the second subset of the plurality of data segments in the buffer at the memory system; and
write the second subset of the plurality of data segments to a second memory device of the plurality of memory devices.

3. The apparatus of claim 2, wherein transmitting the second plurality of requests and writing the first subset of the plurality of data segments in the first memory device at least partially overlap in time.

4. The apparatus of claim 2, wherein storing the second subset of the plurality of data segments in the buffer stores at least one data segment of the second subset of the plurality of data segments in a location of the buffer used to store at least one data segment of the first subset of the plurality of data segments.

5. The apparatus of claim 2, wherein the controller is further configured to cause the apparatus to:
identify, based at least in part on the offset, the first subset and the second subset of the plurality of data segments, the first subset comprising a first data segment with a first logical address and a second data segment with a second logical address, and the second subset comprising a third data segment with a third logical address between the first logical address and the second logical address, wherein the first request is for the first data segment and the at least one additional request is for the second data segment.

6. The apparatus of claim 5, wherein the controller is further configured to cause the apparatus to:
receive, from the host system, a read command for the plurality of data segments;
retrieve the first data segment from the first memory device;
retrieve the third data segment from the second memory device, wherein retrieving the third data segment at least partially overlaps in time with retrieving the first data segment; and
transmit the first data segment and the third data segment to the host system.

7. The apparatus of claim 2, wherein a second offset for a second data segment of the second subset is less than the offset for the data segment associated with the at least one additional request.

8. The apparatus of claim 1, wherein writing the first subset of the plurality of data segments to the first memory device of the plurality of memory devices is configured to cause the apparatus to:
transmit, to the first memory device, a command to perform a multi-level write operation for the first subset of the plurality of data segments.

9. The apparatus of claim 8, wherein a quantity of segment buffers in the buffer of the memory system is less than a product of a quantity of the plurality of memory devices and a quantity of levels of the multi-level write operation.

10. The apparatus of claim 1, wherein the plurality of memory devices comprises a flash memory device.

11. The apparatus of claim 1, wherein the first plurality of requests comprises a ready to transfer (RTT) universal flash storage (UFS) command.

12. The apparatus of claim 1, wherein a length of a data segment of the plurality of data segments corresponds to a page of a memory device of the plurality of memory devices.

13. A non-transitory computer-readable medium storing code, the code comprising instructions executable by a processor to:
receive, at a controller of a memory system and from a host system, a write command associated with a plurality of data segments available at the host system, the memory system comprising a plurality of memory devices;
transmit, to the host system, a first plurality of requests for a first subset of the plurality of data segments, wherein the first plurality of requests comprises a first request and at least one additional request that indicates an offset for a data segment associated with the at least one additional request from a previous request of the first plurality of requests, the offset based at least in part on a quantity of the plurality of memory devices;
receive, from the host system, each of the first subset of the plurality of data segments based at least in part on transmitting the first plurality of requests;
store the first subset of the plurality of data segments in a buffer at the memory system; and
write the first subset of the plurality of data segments to a first memory device of the plurality of memory devices.

14. The non-transitory computer-readable medium of claim 13, wherein the instructions are further executable by the processor to:
transmit, to the host system and subsequent to transmitting the first plurality of requests, a second plurality of requests for a second subset of the plurality of data segments;
receive, from the host system, each of the second subset of the plurality of data segments based at least in part on transmitting the second plurality of requests;
store the second subset of the plurality of data segments in the buffer at the memory system; and
write the second subset of the plurality of data segments to a second memory device of the plurality of memory devices.

15. The non-transitory computer-readable medium of claim 14, wherein transmitting the second plurality of requests and writing the first subset of the plurality of data segments in the first memory device at least partially overlap in time.

16. The non-transitory computer-readable medium of claim 14, wherein storing the second subset of the plurality of data segments in the buffer stores at least one data segment of the second subset of the plurality of data segments in a location of the buffer used to store at least one data segment of the first subset of the plurality of data segments.

17. The non-transitory computer-readable medium of claim 14, wherein the instructions are further executable by the processor to:
identify, based at least in part on the offset, the first subset and the second subset of the plurality of data segments, the first subset comprising a first data segment with a first logical address and a second data segment with a second logical address, and the second subset comprising a third data segment with a third logical address between the first logical address and the second logical address, wherein the first request is for the first data segment and the at least one additional request is for the second data segment.

18. The non-transitory computer-readable medium of claim 17, wherein the instructions are further executable by the processor to:
receive, from the host system, a read command for the plurality of data segments;
retrieve the first data segment from the first memory device;
retrieve the third data segment from the second memory device, wherein retrieving the third data segment at least partially overlaps in time with retrieving the first data segment; and
transmit the first data segment and the third data segment to the host system.

19. The non-transitory computer-readable medium of claim 14, wherein a second offset for a second data segment of the second subset is less than the offset for the data segment associated with the at least one additional request.

20. The non-transitory computer-readable medium of claim 13, wherein the instructions to write the first subset of the plurality of data segments to the first memory device of the plurality of memory devices are executable by the processor to:
transmit, to the first memory device, a command to perform a multi-level write operation for the first subset of the plurality of data segments.

21. The non-transitory computer-readable medium of claim 20, wherein a quantity of segment buffers in the buffer of the memory system is less than a product of a quantity of the plurality of memory devices and a quantity of levels of the multi-level write operation.

22. The non-transitory computer-readable medium of claim 13, wherein the plurality of memory devices comprises a flash memory device.

23. The non-transitory computer-readable medium of claim 13, wherein the first plurality of requests comprises a ready to transfer (RTT) universal flash storage (UFS) command.

24. The non-transitory computer-readable medium of claim 13, wherein a length of a data segment of the plurality of data segments corresponds to a page of a memory device of the plurality of memory devices.

25. A method, comprising:
receiving, at a controller of a memory system and from a host system, a write command associated with a plurality of data segments available at the host system, the memory system comprising a plurality of memory devices;
transmitting, to the host system, a first plurality of requests for a first subset of the plurality of data segments, wherein the first plurality of requests comprises a first request and at least one additional request that indicates an offset for a data segment associated with the at least one additional request from a previous request of the first plurality of requests, the offset based at least in part on a quantity of the plurality of memory devices;
receiving, from the host system, each of the first subset of the plurality of data segments based at least in part on transmitting the first plurality of requests;
storing the first subset of the plurality of data segments in a buffer at the memory system; and
writing the first subset of the plurality of data segments to a first memory device of the plurality of memory devices.

\* \* \* \* \*